(12) United States Patent
Kadam et al.

(10) Patent No.: US 9,979,318 B2
(45) Date of Patent: May 22, 2018

(54) HYBRID MULTILEVEL INVERTER

(71) Applicant: Indian Institute of Technology Bombay, Mumbai (IN)

(72) Inventors: Abhijit Kadam, Thane (IN); Anshuman Shukla, Samastipur (IN)

(73) Assignee: Indian Institute of Technology Bombay, Mumbai, MH (IN)

( * ) Notice: Subject to any disclaimer, the term of this patent is extended or adjusted under 35 U.S.C. 154(b) by 0 days. days.

(21) Appl. No.: 15/354,027

(22) Filed: Nov. 17, 2016

(65) Prior Publication Data

US 2017/0194877 A1 Jul. 6, 2017

(30) Foreign Application Priority Data

Dec. 23, 2015 (IN) .......................... 4840/MUM/2015
Dec. 23, 2015 (IN) .......................... 4841/MUM/2015

(51) Int. Cl.
*H02M 7/537* (2006.01)
*H02M 7/487* (2007.01)
(52) U.S. Cl.
CPC .................................. *H02M 7/487* (2013.01)
(58) Field of Classification Search
CPC .... H02M 5/458; H02M 3/3155; H02M 3/325; H02M 3/335; H02M 7/537
See application file for complete search history.

(56) References Cited

U.S. PATENT DOCUMENTS

2015/0194902 A1\* 7/2015 Tian ...................... H02M 5/458
363/37

\* cited by examiner

*Primary Examiner* — Adolf Berhane
*Assistant Examiner* — Afework Demisse

(57) ABSTRACT

Embodiments herein disclose a hybrid multilevel inverter configured to obtain N-level output voltages based on operating one of FCs and a plurality of switches. In an embodiment, the multilevel inverter is a Neutral Point Clamped (NPC) Flying Capacitor (FC) based hybrid multilevel inverter. In an embodiment, the multilevel inverter is a stacked multi-cell NPC multilevel inverter.

18 Claims, 15 Drawing Sheets

HYBRID MULTILEVEL INVERTER

TECHNICAL FIELD

The embodiments herein relates to a multilevel inverter. The present application is based on, and claims priority from, the Indian Application Numbers, 4840/MUM/2015 filed on 23 Dec. 2015 and 4841/MUM/2015 filed on 23 Dec. 2015, the disclosure of which is hereby incorporated by reference.

BACKGROUND

Presently, multilevel inverters are popular in a medium power application. As the voltage level increases, the number of identical Flying Capacitor (FC) increases exponentially. This causes reliability issues for higher level outputs in the multilevel inverter. The size of the FCs depends upon line frequency as well. Thus, it is necessary to develop a new topology with less number of identical FCs, optimum number of switches and smaller size of FCs such that, there is enough redundancy states available to charge and discharge the FCs for each voltage level.

Further, with increase in voltage levels, the number of semiconductor devices increase exponentially. This causes reliability issues for higher level outputs. With the increase in number of semiconductor devices, the total conduction losses are also increased. There is a requirement for developing a topology with optimum number of semiconductor devices and lower conduction losses in comparison with existing topologies.

The above information is presented as background information only to help the reader to understand the present invention. Applicants have made no determination and make no assertion as to whether any of the above might be applicable as Prior Art with regard to the present application.

SUMMARY

The embodiments herein disclose a multilevel inverter configured to obtain N-level output voltages based on operating one of FCs and a plurality of switches.

In an embodiment, the multilevel inverter includes a plurality of switches, a plurality of Direct Current (DC) link capacitors, and one or more NPC based FCs. The hybrid multilevel inverter generates a N-level output voltages based on switching pattern of the plurality of switches which results in one of charging, and discharging of one or more NPC based FCs for each voltage level.

In an embodiment, the hybrid multilevel inverter is configured to generate N-level output voltages based on switching pattern of the plurality of switches which results in one of charging, and discharging of one or more NPC based FCs for each voltage level.

In an embodiment, the multilevel inverter which includes a set of diodes connected to a set of switches. The multilevel inverter is configured to produce N-level output voltages based on a switching pattern of the set of switches and input voltage source of $2V_{dc}$.

In an embodiment, the stacked multi-cell NPC multilevel inverter is configured to produce the N-level output voltages based on a switching pattern of the set of switches and input voltage source of $2V_{dc}$.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1A:
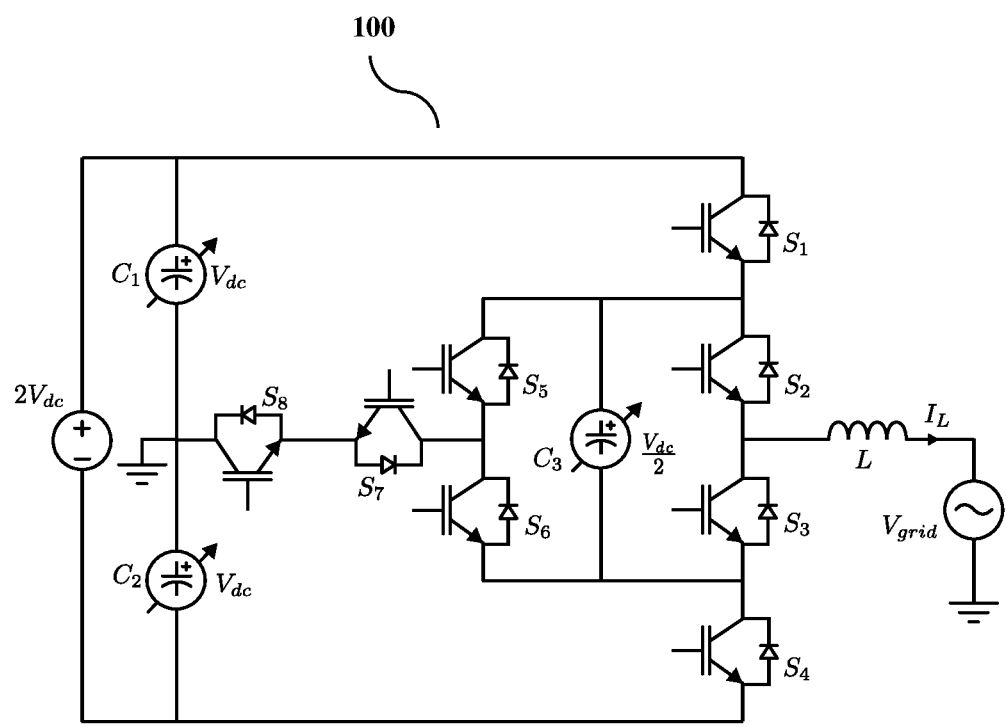
FIG. 1a is a circuit diagram of a 5-level NPC FC based hybrid multilevel inverter, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Accordingly the embodiments herein disclose a multilevel inverter configured to obtain N-level output voltages based on operating one of FCs and a plurality of switches.

In an embodiment, the NPC FC based hybrid multilevel inverter includes a plurality of switches, a plurality of Direct Current (DC) link capacitors, and one or more NPC based FCs. The hybrid multilevel inverter generates a N-level output voltages based on a switching pattern of the plurality of switches which results in one of charging, and discharging of one or more NPC based FCs for each voltage level.

In an embodiment, the NPC FC based hybrid multilevel inverter generates at least one redundancy state to charge and discharge one or more NPC based FCs.

In an embodiment, the output voltages associated with a 5-level NPC FC based hybrid multilevel inverter for DC link voltage of $2V_{dc}$ are $V_{dc}$, $V_{dc}/2$, 0, $-V_{dc}/2$, and $-V_{dc}$.

In an embodiment, the output voltages associated with a 7-level NPC FC based hybrid multilevel inverter for DC link voltage of $2V_{dc}$ are $V_{dc}$, $2V_{dc}/3$, $V_{dc}/3$, 0, $-V_{dc}/3$, $-2V_{dc}/3$, and $-V_{dc}$.

In an embodiment, the output voltages associated with a 9-level NPC FC based hybrid multilevel inverter for DC link voltage of $2V_{dc}$ are $V_{dc}$, $3V_{dc}/4$, $V_{dc}/2$, $V_{dc}/4$, 0, $-V_{dc}/4$, $-V_{dc}/2$, $-3V_{dc}/4$, and $-V_{dc}$.

In an embodiment, the multilevel inverter includes a set of diodes connected to a set of switches. The multilevel inverter is configured to produce N-level output voltages based on a switching pattern of the set of switches and input voltage source of $2V_{dc}$.

In an embodiment, the set of diodes are clamping diodes.

In an embodiment, the set of diodes are replaced by the set of switches.

In an embodiment, the 7-level output voltages are $V_{dc}$, $2V_{dc}/3$, $V_{dc}/3$, 0, $-V_{dc}/3$, $-2V_{dc}/3$, and $-V_{dc}$. The set of 12 switches ($S_1$-$S_{12}$) and six diodes ($D_1$-$D_6$) are connected to obtain the 7-level output voltages in the 7-level SM-NPC multilevel inverter.

In an embodiment, the $V_{dc}$ output voltage is obtained by operating $S_1$, $S_2$ and $S_3$, the $2V_{dc}/3$ output voltage is obtained by operating one of $S_2$ and $S_3$, and $S_{11}$, the $V_{dc}/3$ output voltage is obtained by operating $S_3$, $S_7$, $S_8$, and $S_{11}$, the 0 output voltage is obtained by operating $S_3$ and $S_4$, the $-V_{dc}/3$ output voltage is obtained by operating $S_4$, $S_9$, $S_{10}$ and $S_{11}$, the $-2V_{dc}/3$ output voltage is obtained by operating one of $S_{12}$, and $S_4$ and $S_5$, and the $-V_{dc}$ output voltage is obtained by operating $S_4$, $S_5$, and $S_6$ in the 7-level SM-NPC multilevel inverter.

In an embodiment, the stacked multi-cell inverter is configured to generate the redundancy state to normalize the stress handled by the switches with a proper modulation strategy.

Unlike the conventional multilevel inverters, the proposed NPC FC based hybrid multilevel inverter provides more redundancy states for capacitor voltage balancing. The NPC FC based hybrid multilevel inverter requires less number of flying capacitors. This results in improving reliability of the NPC FC based hybrid multilevel inverter. The NPC FC based hybrid multilevel inverter requires lesser number of identical switches. The NPC FC based hybrid multilevel inverter has lower conduction losses and provides more levels of output voltage levels. The NPC FC based hybrid multilevel inverter is simple to use, and easy to adopt.

The NPC FC based hybrid multilevel inverter has minimum losses. The proposed NPC FC based hybrid multilevel inverter is environmental friendly. The proposed NPC FC based hybrid multilevel inverter is operated based on switching frequencies. The proposed NPC FC based hybrid multilevel inverter is useful for a low voltage application, and a medium voltage application. The NPC FC based hybrid multilevel inverter can also be used as multilevel converter, a photovoltaic (PV) inverter, and for medium power drives application, a custom power application or the like.

Unlike conventional multilevel inverters, the proposed stacked multi-cell multilevel inverter requires a lesser number of semiconductor devices. This results in improving reliability of the multilevel inverter. The stacked multi-cell multilevel inverter has lower computational requirements and lower conduction losses as compared to existing NPC based technologies. The stacked multi-cell multilevel inverter is simple to use, and easy to adopt. The stacked multi-cell multilevel inverter has lower losses.

The stacked multi-cell inverter generates the redundancy state to normalize the stress handled by the switches with a proper modulation strategy.

The stacked multi-cell multilevel inverter can be used in a low voltage application and a medium voltage application. The multilevel inverter can be used in a photovoltaic (PV), a medium power drives application, a custom power application or the like.

Referring now to the drawings and more particularly to FIGS. 1a through 14, where similar reference characters denote corresponding features consistently throughout the figures, there are shown preferred embodiments.

FIG. 1a is a circuit diagram of a 5-level NPC FC based hybrid multilevel inverter 100 including a NPC based FC, according to the embodiments as disclosed herein. The 5-level NPC FC based hybrid multilevel inverter 100 includes eight switches ($S_1$-$S_8$), DC link capacitors ($C_1$ and $C_2$), and flying capacitor ($C_3$). The 5-level NPC FC based hybrid multilevel inverter 100 generates five levels of output voltages. The output voltages for the DC link voltage of $2V_{dc}$ are $V_{dc}$, $V_{dc}/2$, 0, $-V_{dc}/2$, and $-V_{dc}$. In an embodiment, the NPC based FC is T shaped NPC based FC.

Table-1 shows the appropriate switching patterns by which voltage across $C_3$ is maintained at $V_{dc}/2$. The charging and discharging of the NPC based FC ($C_3$) is shown by symbols + and − respectively. The Not Connected (NC) symbolizes that the capacitor is bypassed. Current direction is assumed to be positive. Table-1 shows the switching pattern for the 5-level NPC FC based hybrid multilevel inverter 100. Table-1 shows that for every voltage level where the capacitor ($C_3$) charges, there is a charging state or the discharging state, therefore the capacitor voltage is balanced.

TABLE 1

| $V_0$ | $S_1$ | $S_2$ | $S_3$ | $S_4$ | $S_5$ | $S_6$ | $S_{7/}$ $S_8$ | $C_3$ |
|---|---|---|---|---|---|---|---|---|
| $V_{dc}$ | ON | ON | OFF | OFF | OFF | OFF | OFF | NC |
| $V_{dc}/2$ | ON | OFF | ON | OFF | OFF | OFF | OFF | + |
|  | OFF | ON | OFF | OFF | OFF | ON | ON | − |
| 0 | OFF | ON | OFF | OFF | ON | OFF | ON | NC |
|  | OFF | OFF | ON | OFF | OFF | ON | ON | NC |
| $-V_{dc}/2$ | OFF | OFF | ON | OFF | ON | OFF | ON | − |
|  | OFF | ON | OFF | ON | OFF | OFF | OFF | + |
| $-V_{dc}$ | OFF | OFF | ON | ON | OFF | OFF | OFF | NC |

Figure 1B:
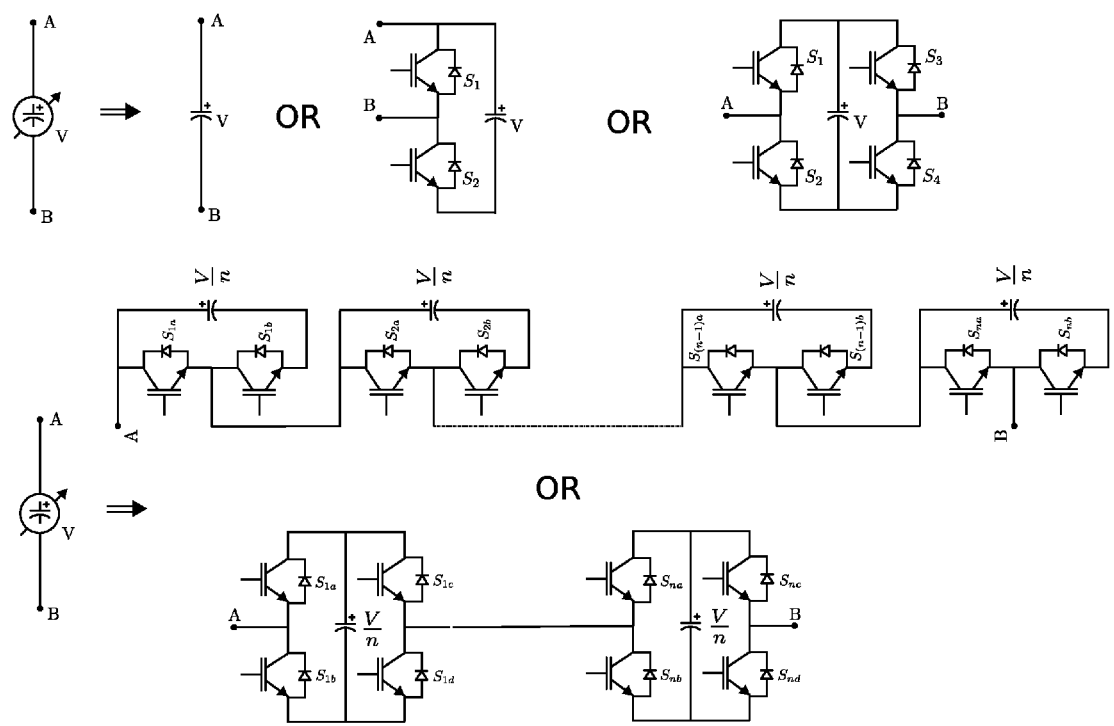
FIG. 1b is a circuit diagram depicting one or all flying capacitors or DC link capacitors consisting same or different controllable voltage sources, according to the embodiments as disclosed herein.

In an embodiment, either one or all the capacitors may consist of same or different controllable voltage sources as shown in the FIG. 1b.

In an embodiment, either one or all the capacitors includes a controllable voltage source consisting of a switched capacitor network of one or more submodules connected in series.

In an embodiment, the controllable voltage sources may consists of dependent or independent sources, which can be realized by switched capacitor circuits or any other circuits having such functionalities. These switched capacitor circuits may consist of one or more submodules connected in series.

In an embodiment, the switches can be realized using series or parallel combination of devices having bidirectional current carrying capabilities. The devices may be realized using an Insulated-Gate Bipolar Transistor (IGBT), a Metal-Oxide-Semiconductor Field-Effect Transistor (MOSFET), thyristors, diodes, or using other devices of these class.

In an embodiment, the DC sources may be realized using batteries, photovoltaic (PV) modules, fuel cells, front end converters, or any other power sources.

Figure 2:
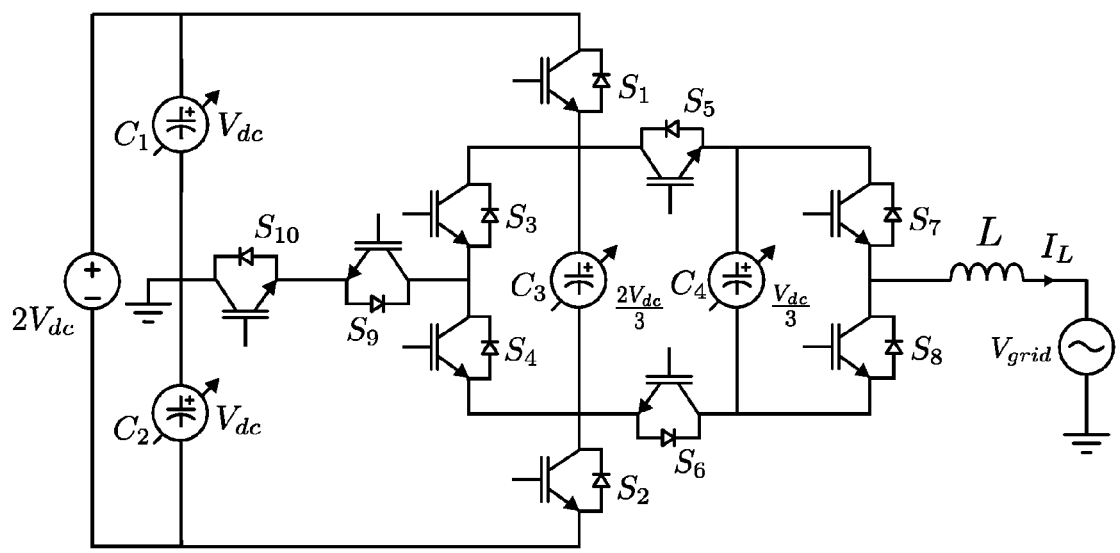
FIG. 2 is a circuit diagram of a 7-level NPC FC based hybrid multilevel inverter, according to the embodiments as disclosed herein.

FIG. 2 is a circuit diagram of a 7-level NPC FC based hybrid multilevel inverter 200 including the NPC based FCs, according to the embodiments as disclosed herein. The 7-level NPC FC based hybrid multilevel inverter 200 includes ten switches ($S_1$-$S_{10}$), DC link capacitors ($C_1$ and $C_2$), and flying capacitor ($C_3$ and $C_4$). The 7-level NPC FC based hybrid multilevel inverter 200 generates seven levels of output voltages. The output voltages for the DC link voltage of $2V_{dc}$ are $V_{dc}$, $2V_{dc}/3$, $V_{dc}/3$, 0, $-V_{dc}/3$, $-2V_{dc}/3$, and $-V_{dc}$. FIG. 2 depicts that the inverter topology that can be extended to give a 7-level output. In order to generate 7-level output, the flying capacitors $C_3$ and $C_4$ are charged to voltage of $2V_{dc}/3$ and $V_{dc}/3$ respectively. The switching pattern to generate 7-level output is shown in Table-2 Similarly, it can be generalized to give N-level output.

TABLE 2

| $V_0$ | $S_1$ | $S_2$ | $S_3$ | $S_4$ | $S_5$ | $S_6$ | $S_7$ | $S_8$ | $S_{9/}S_{10}$ | $C_3$ | $C_4$ |
|---|---|---|---|---|---|---|---|---|---|---|---|
| $V_{dc}$ | ON | OFF | OFF | OFF | ON | OFF | ON | OFF | OFF | NC | NC |
| $2V_{dc}/3$ | ON | OFF | OFF | OFF | OFF | ON | ON | OFF | OFF | + | − |
|  | ON | OFF | OFF | OFF | ON | OFF | OFF | ON | OFF | NC | + |
|  | OFF | OFF | OFF | ON | ON | OFF | ON | OFF | ON | − | NC |
| $V_{dc}/3$ | OFF | OFF | OFF | ON | ON | OFF | OFF | ON | ON | − | + |
|  | ON | OFF | OFF | OFF | OFF | ON | OFF | ON | OFF | + | NC |
|  | OFF | OFF | OFF | ON | OFF | ON | ON | OFF | ON | NC | − |
| 0 | OFF | OFF | ON | OFF | ON | OFF | ON | OFF | OFF | NC | NC |
|  | OFF | OFF | OFF | ON | OFF | ON | OFF | ON | ON | NC | NC |
| $-V_{dc}/3$ | OFF | OFF | ON | OFF | OFF | ON | ON | OFF | ON | + | − |
|  | OFF | ON | OFF | OFF | ON | OFF | ON | OFF | OFF | − | NC |
|  | OFF | OFF | ON | OFF | ON | OFF | OFF | ON | ON | NC | + |
| $-2V_{dc}/3$ | OFF | ON | OFF | OFF | ON | OFF | OFF | ON | OFF | − | + |
|  | OFF | ON | OFF | OFF | OFF | ON | ON | OFF | OFF | NC | − |
|  | OFF | OFF | ON | OFF | OFF | ON | OFF | ON | ON | + | NC |
| $-V_{dc}$ | OFF | ON | OFF | OFF | OFF | ON | OFF | ON | OFF | NC | NC |

Figure 3:
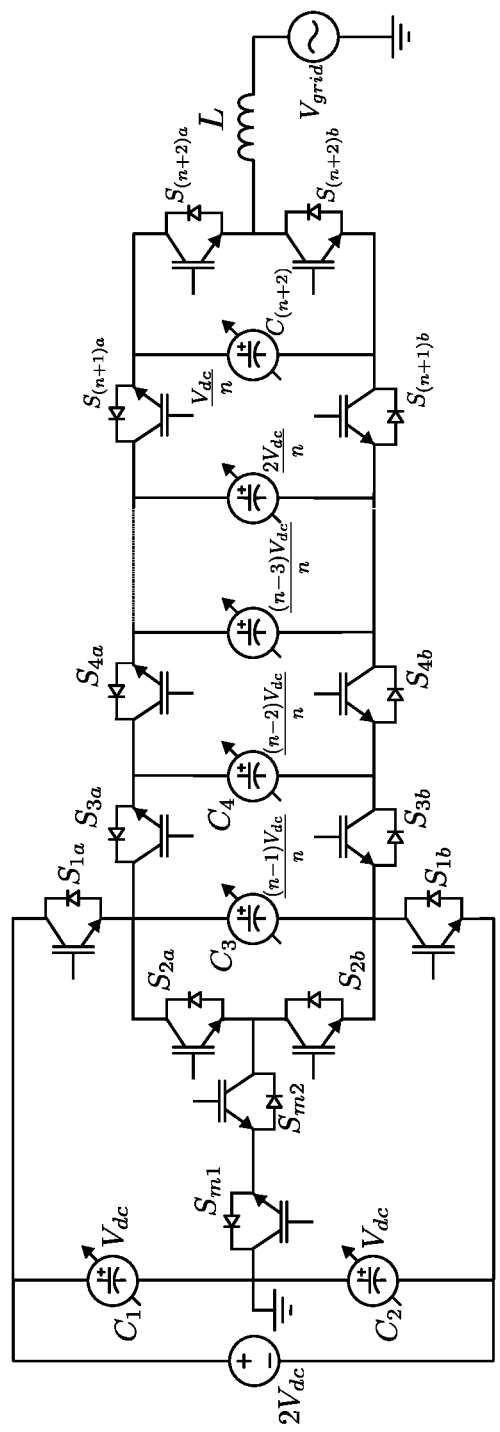
FIG. 3 is a circuit diagram of a n-level NPC FC based hybrid multilevel inverter, according to the embodiments as disclosed herein.

FIG. 3 is a circuit diagram of an n-level NPC FC based hybrid multilevel inverter 300 including the NPC based FCs, according to the embodiments as disclosed herein. FIG. 3 depicts that the inverter topology described in the FIG. 2 can be extended to provide N-level output.

Figure 4:
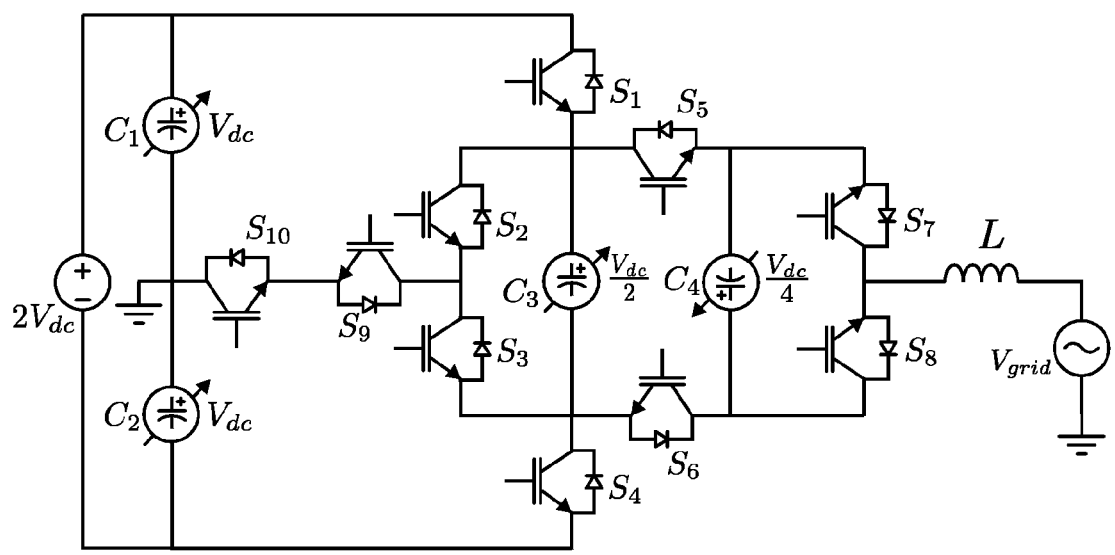
FIG. 4 is a circuit diagram of a 9-level NPC FC based hybrid multilevel inverter, according to the embodiments as disclosed herein.

FIG. 4 is a circuit diagram of a 9-level NPC FC based hybrid multilevel inverter 400 including NPC based FCs, according to the embodiments as disclosed herein. The 9-level NPC FC based hybrid multilevel inverter 400 includes ten switches ($S_1$-$S_{10}$), DC link capacitors ($C_1$ and $C_2$), and flying capacitor ($C_3$ and $C_4$). The 9-level NPC FC based hybrid multilevel inverter 400 generates nine levels of output voltages. The output voltages for the DC link voltage of $2V_{dc}$ are $V_{dc}$, $3V_{dc}/4$, $V_{dc}/2$, $V_{dc}/4$, 0, $-V_{dc}/4$, $-V_{dc}/2$, $-3V_{dc}/4$, and $-V_{dc}$. The 7-level topology described in FIG. 2 can be modified by cross connecting the switches $S_5$ and $S_6$ to get 9-level output with the flying capacitors $C_3$ and $C_4$ charged to voltage of $V_{dc}/2$ and $V_{dc}/4$ respectively. The switching pattern for generating 9-level output is shown in Table-3.

TABLE 3

| $V_0$ | $S_1$ | $S_2$ | $S_3$ | $S_4$ | $S_5$ | $S_6$ | $S_7$ | $S_8$ | $S_{9/}S_{10}$ | $C_3$ | $C_4$ |
|---|---|---|---|---|---|---|---|---|---|---|---|
| $V_{dc}$ | ON | OFF | OFF | OFF | ON | OFF | ON | OFF | OFF | NC | NC |
| $3V_{dc}/4$ | OFF | OFF | ON | OFF | ON | OFF | OFF | ON | ON | − | − |
| $V_{dc}/2$ | ON | OFF | OFF | OFF | OFF | ON | OFF | ON | OFF | + | NC |
|  | OFF | OFF | ON | OFF | ON | OFF | ON | OFF | ON | − | NC |
| $V_{dc}/4$ | ON | OFF | OFF | OFF | OFF | ON | ON | OFF | OFF | + | + |
|  | OFF | ON | OFF | OFF | ON | OFF | OFF | ON | ON | NC | − |
| 0 | OFF | ON | OFF | OFF | ON | OFF | ON | OFF | ON | NC | NC |
|  | OFF | OFF | ON | OFF | OFF | ON | OFF | ON | ON | NC | NC |
| $-V_{dc}/4$ | OFF | OFF | OFF | ON | ON | OFF | OFF | ON | OFF | − | − |
|  | OFF | OFF | ON | OFF | OFF | ON | ON | OFF | ON | NC | + |
| $-V_{dc}/2$ | OFF | OFF | OFF | ON | ON | OFF | ON | OFF | OFF | − | NC |

TABLE 3-continued

| V₀ | S₁ | S₂ | S₃ | S₄ | S₅ | S₆ | S₇ | S₈ | S₉/S₁₀ | C₃ | C₄ |
|---|---|---|---|---|---|---|---|---|---|---|---|
|  | OFF | ON | OFF | OFF | OFF | ON | OFF | ON | ON | + | NC |
| −3 V$_{dc}$/4 | OFF | ON | OFF | OFF | OFF | ON | ON | OFF | ON | + | + |
| −V$_{dc}$ | OFF | OFF | OFF | ON | OFF | ON | OFF | ON | OFF | NC | NC |

Figure 5:
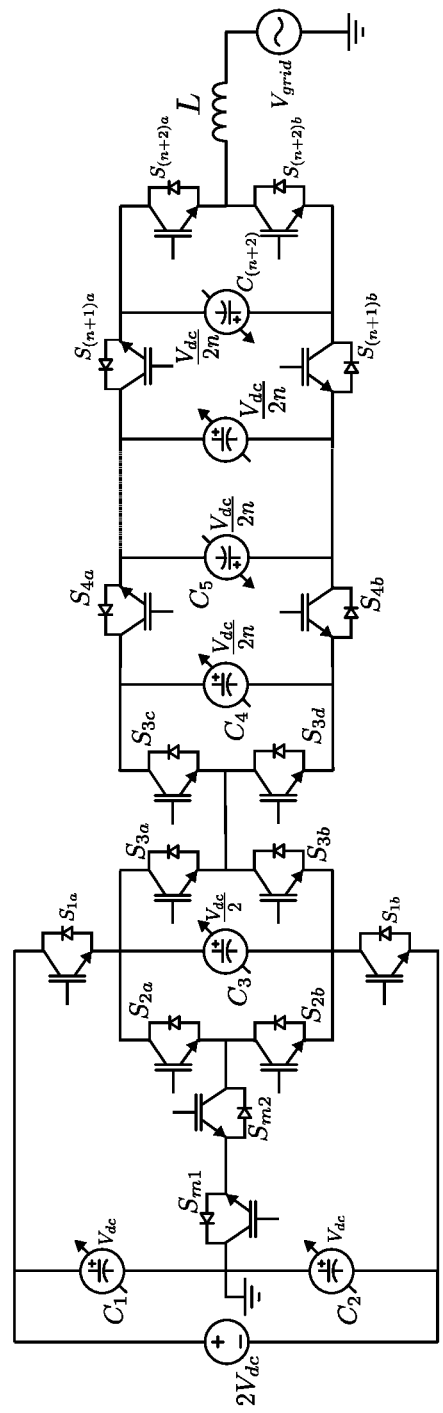
FIG. 5 is a circuit diagram of a n-level NPC FC based hybrid multilevel inverter, according to the embodiments as disclosed herein.

FIG. 5 is a circuit diagram of an n-level NPC FC based hybrid multilevel inverter 500 including the NPC based FCs, according to the embodiments as disclosed herein. Instead of using flying capacitors clamped at different voltages, the basic structure described in the FIG. 1 can be extended to an NPC hybrid topology. This topology can generate N-level output, where each capacitor is charged to V$_{dc}$/2N.

Figure 6:
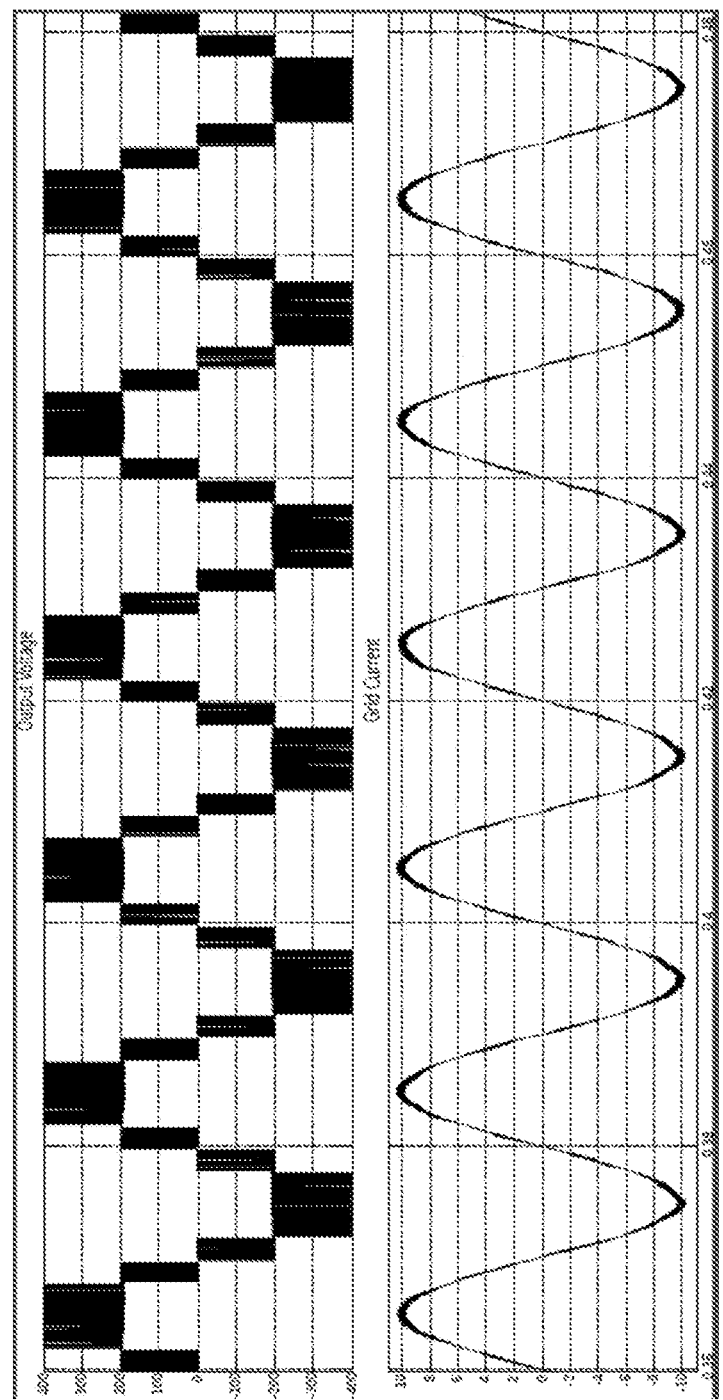
FIG. 6 is a graph showing an output voltage and grid current for a 5-level NPC FC based hybrid multilevel inverter, according to the embodiments as disclosed herein.
Figure 7:
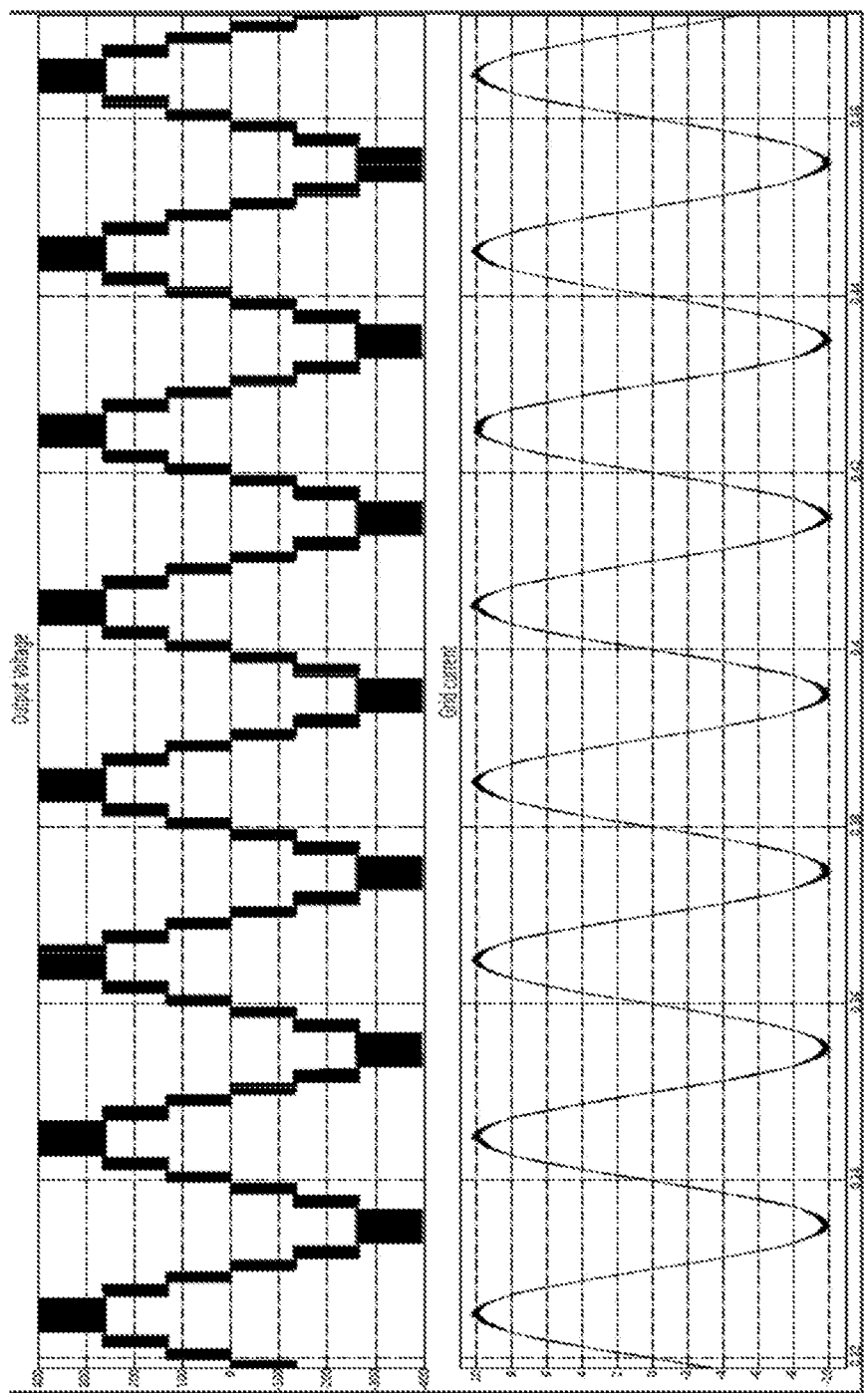
FIG. 7 is a graph showing an output voltage and a grid current for a 7-level NPC FC based hybrid multilevel inverter, according to the embodiments as disclosed herein.

FIG. 6 is a graph illustrating an output voltage and a grid current for the 5-level NPC FC based hybrid multilevel inverter 100, according to the embodiments as disclosed herein. FIG. 7 is a graph illustrating the output voltage and the grid current for the 7-level NPC FC based hybrid multilevel inverter 200, according to the embodiments as disclosed herein.

Figure 8:
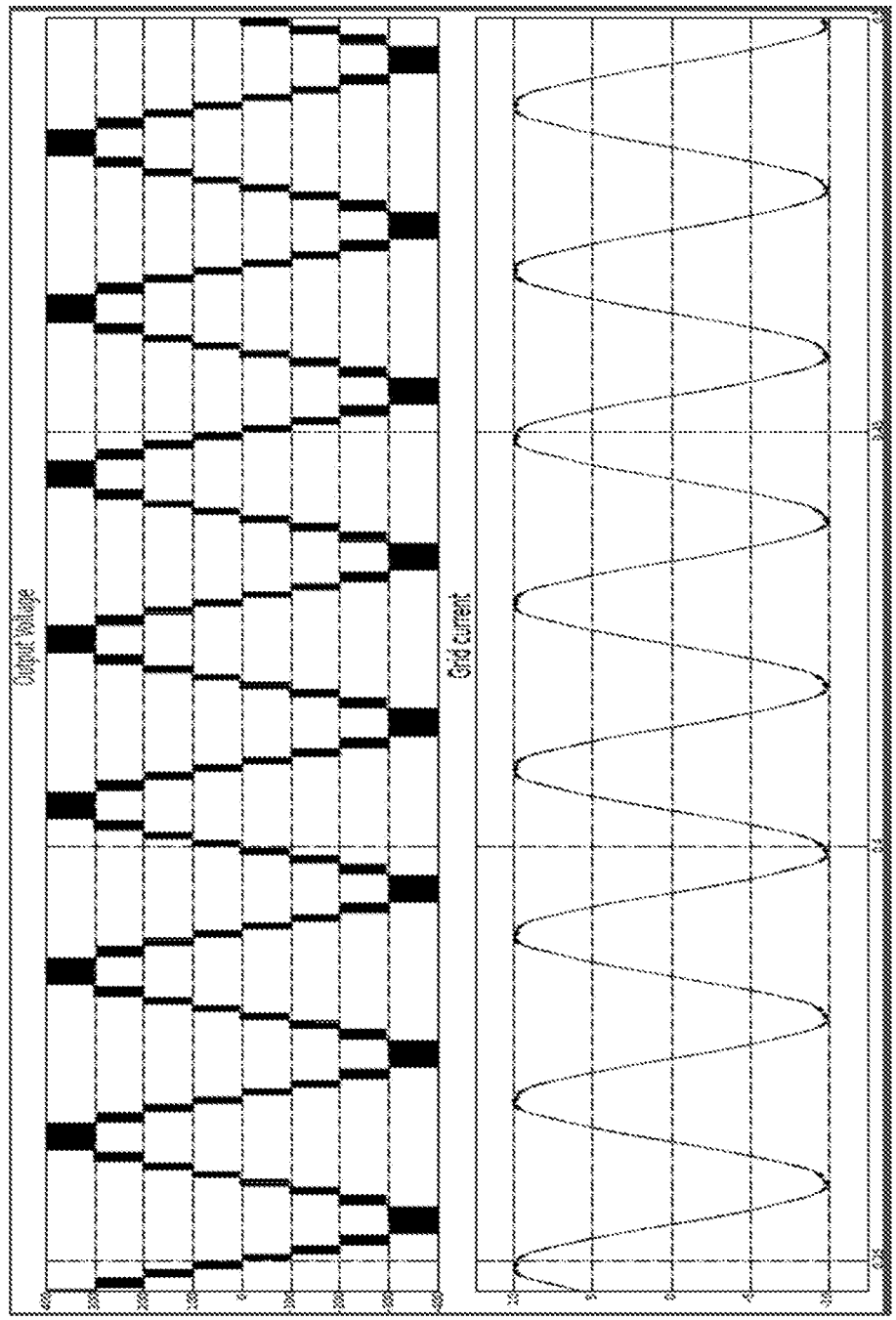
FIG. 8 is a graph showing an output voltage and grid current for a 9-level NPC FC based hybrid multilevel inverter, according to the embodiments as disclosed herein.

FIG. 8 is a graph illustrating the output voltage and grid current for the 9-level NPC FC based hybrid multilevel inverter 400, according to the embodiments as disclosed herein. To verify the working of the proposed inverter topology, a simulation model of single phase converter is built in Matlab simulink. The simulation parameters used are summarized in Table-4. The inverter topology operates in a current control mode. The inverter topology can supply real as well as reactive power. To demonstrate this, simulation results with a reference current of 10 A in phase for the 5-level hybrid multilevel inverter 100 and 7-level hybrid multilevel inverter 200 is shown in the FIGS. 6 and 7, respectively. Simulation result for the 9-level hybrid multilevel inverter 400 is shown in the FIG. 8.

TABLE 4

| S. NO | Parameter | Value |
|---|---|---|
| 1 | DC link voltage | 400 V |
| 2 | Flying capacitor value | 50 uF |
| 3 | Grid voltage/frequency | 230 V/50 Hz |
| 4 | Grid inductance | 8 mH |

Figure 9:
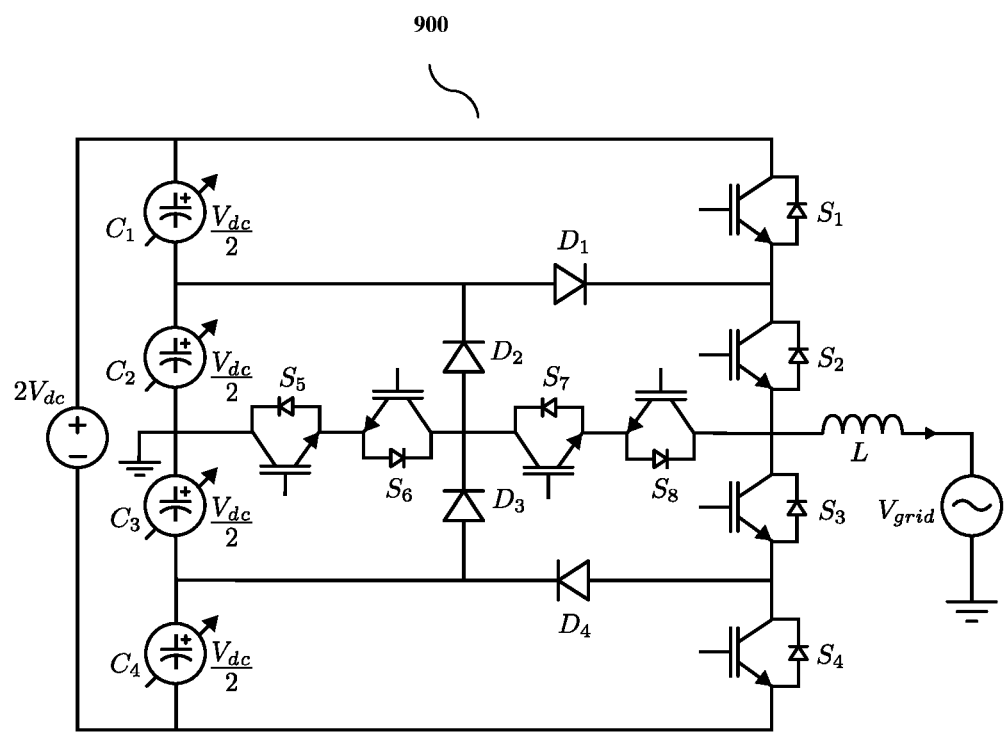
FIG. 9 is a circuit diagram of a 5-level Stacked Multi-Cell NPC (SM-NPC) multilevel inverter, according to the embodiments as disclosed herein.

FIG. 9 is a circuit diagram of a 5-level Stacked Multi-Cell Neutral Point Clamped (SM-NPC) multilevel inverter 900, according to the embodiments as disclosed herein. The 5-level SM-NPC multilevel inverter 900 includes eight switches S₁-S₈ and four diodes D₁-D₄ arranged together. The direction of current is assumed to be positive. The output voltages obtained are V$_{dc}$, V$_{dc}$/2, 0, −V$_{dc}$/2, and −V$_{dc}$. In the multilevel inverter 900, the V$_{dc}$ output voltage is obtained by operating S₁ and S₂, the V$_{dc}$/2 output voltage is obtained by operating one of the S₂, S₇ and S₈, the 0 output voltage is obtained by operating S₅-S₈, the −V$_{dc}$/2 output voltage is obtained by operating one of S₃, S₇ and S₈, and the −V$_{dc}$ output voltage is obtained by operating S₃ and S₄. The Table-5 shows the switching patterns to generate appropriate voltages. The + and − symbols shown in Table-5 represents the positive and negative current directions respectively.

TABLE 5

| V₀ | S₁ | S₂ | S₃ | S₄ | S₅/S₆ | S₇/S₈ | I |
|---|---|---|---|---|---|---|---|
| V$_{dc}$ | 1 | 1 | 0 | 0 | 0 | 0 | +/− |
| V$_{dc}$/2 | 0 | 1 | 0 | 0 | 0 | 0 | + |
|  | 0 | 0 | 0 | 0 | 0 | 1 | − |
| 0 | 0 | 0 | 0 | 0 | 1 | 1 | +/− |
| −V$_{dc}$/2 | 0 | 0 | 0 | 0 | 0 | 1 | + |
|  | 0 | 0 | 1 | 0 | 0 | 0 | − |
| −V$_{dc}$ | 0 | 0 | 1 | 1 | 0 | 0 | +/− |

In an embodiment, either one or all the capacitors includes a controllable voltage source consisting of a switched capacitor network of one or more submodules connected in series.

Figure 10:
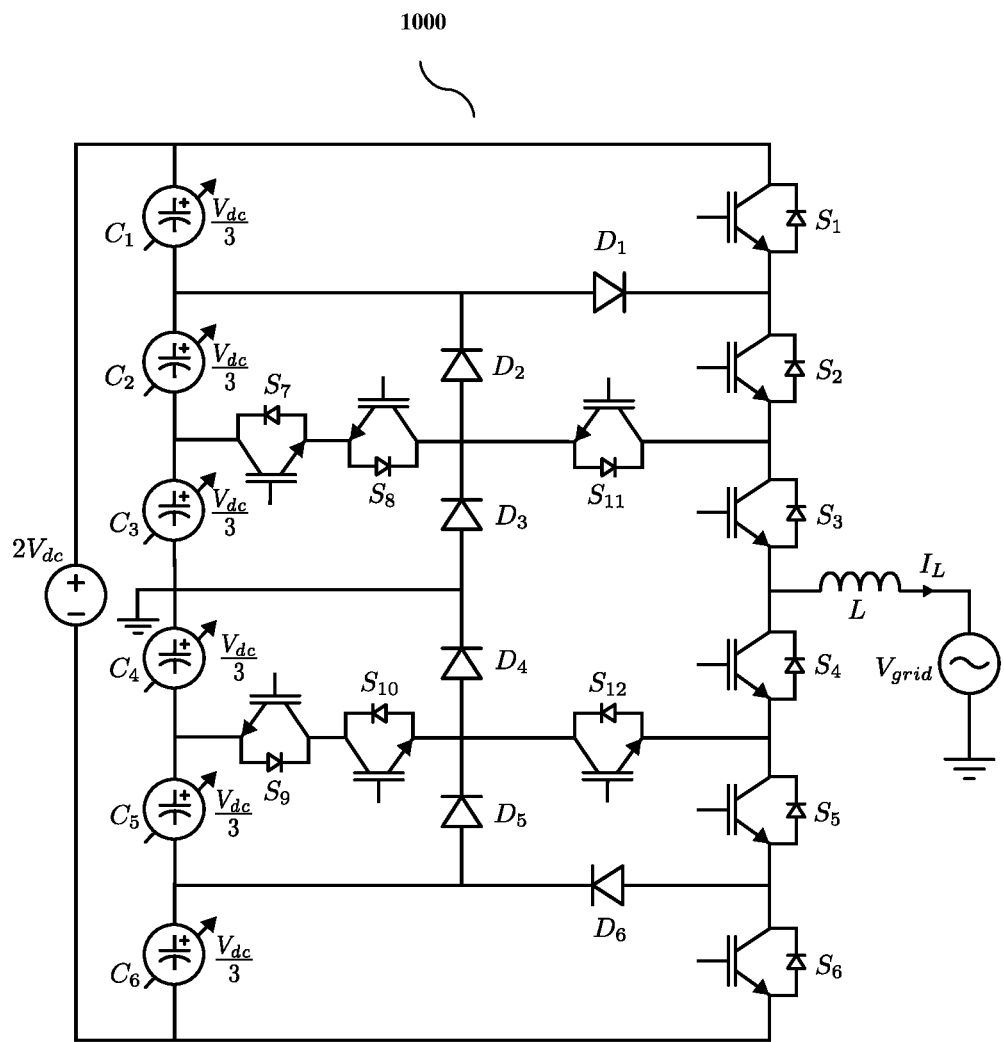
FIG. 10 is a circuit diagram of a 7-level SM-NPC multilevel inverter, according to the embodiments as disclosed herein.

FIG. 10 is a circuit diagram of a 7-level SM-NPC multilevel inverter 1000, according to the embodiments as disclosed herein. In this topology, the semiconductor devices S₃ and S₄ are rated for V$_{dc}$. The semiconductor devices S₂, S₅, and diodes D₂, D₅ are rated for 2V$_{dc}$/3. The semiconductor devices S₁, S₆, S₇, S₈, S₉, S₁₀, S₁₁, S₁₂, and diodes D₁, D₆ are rated for V$_{dc}$/3. Thus, 7-level SM-NPC multilevel inverter 1000 includes eighteen identical switches and ten identical diodes, which make a total of twenty eight semiconductors devices each rated for V$_{dc}$/3. In comparison with conventional 7-level NPC which is having twelve switches and thirty diodes, the 7-level SM-NPC multilevel inverter 1000 requires fourteen fewer semiconductor devices. In the multilevel inverter 1000, the V$_{dc}$ output voltage is obtained by operating S₁, S₂ and S₃, the 2V$_{dc}$/3 output voltage is obtained by operating one of S₂ and S₃, and S₁₁, the V$_{dc}$/3 output voltage is obtained by operating S₃, S₇, S₈, and S₁₁, the 0 output voltage is obtained by operating S₃ and S₄, the −V$_{dc}$/3 output voltage is obtained by operating S₄, S₉, S₁₀ and S₁₂, the −2V$_{dc}$/3 output voltage is obtained by operating one of S₁₂, and S₄ and S₅, and the −V$_{dc}$ output voltage is obtained by operating S₄, S₅, and S₆. The switching patterns required to generate appropriate voltages for the multilevel inverter 1000 is shown in Table-6. The + and − symbols shown in Table-6 represents the positive and negative current directions respectively.

TABLE 6

| V₀ | S₁ | S₂ | S₃ | S₄ | S₅ | S₆ | S₇/S₈ | S₉/S₁₀ | S₁₁ | S₁₂ | I |
|---|---|---|---|---|---|---|---|---|---|---|---|
| V$_{dc}$ | 1 | 1 | 1 | 0 | 0 | 0 | 0 | 0 | 0 | 0 | +/− |
| 2 V$_{dc}$/3 | 0 | 1 | 1 | 0 | 0 | 0 | 0 | 0 | 0 | 0 | + |
|  | 0 | 0 | 0 | 0 | 0 | 0 | 0 | 0 | 1 | 0 | − |
| V$_{dc}$/3 | 0 | 0 | 1 | 0 | 0 | 0 | 1 | 0 | 1 | 0 | +/− |
| 0 | 0 | 0 | 1 | 1 | 0 | 0 | 0 | 0 | 0 | 0 | +/− |
| −V$_{dc}$/3 | 0 | 0 | 0 | 1 | 0 | 0 | 0 | 1 | 0 | 1 | +/− |
| −2 V$_{dc}$/3 | 0 | 0 | 0 | 0 | 0 | 0 | 0 | 0 | 0 | 1 | + |
|  | 0 | 0 | 0 | 1 | 1 | 0 | 0 | 0 | 0 | 0 | − |
| −V$_{dc}$ | 0 | 0 | 0 | 1 | 1 | 1 | 0 | 0 | 0 | 0 | +/− |

Further, the FIG. 10 depicts the 7-level SM-NPC, which can be considered as a fundamental block that can be extended for N-levels.

Figure 11:
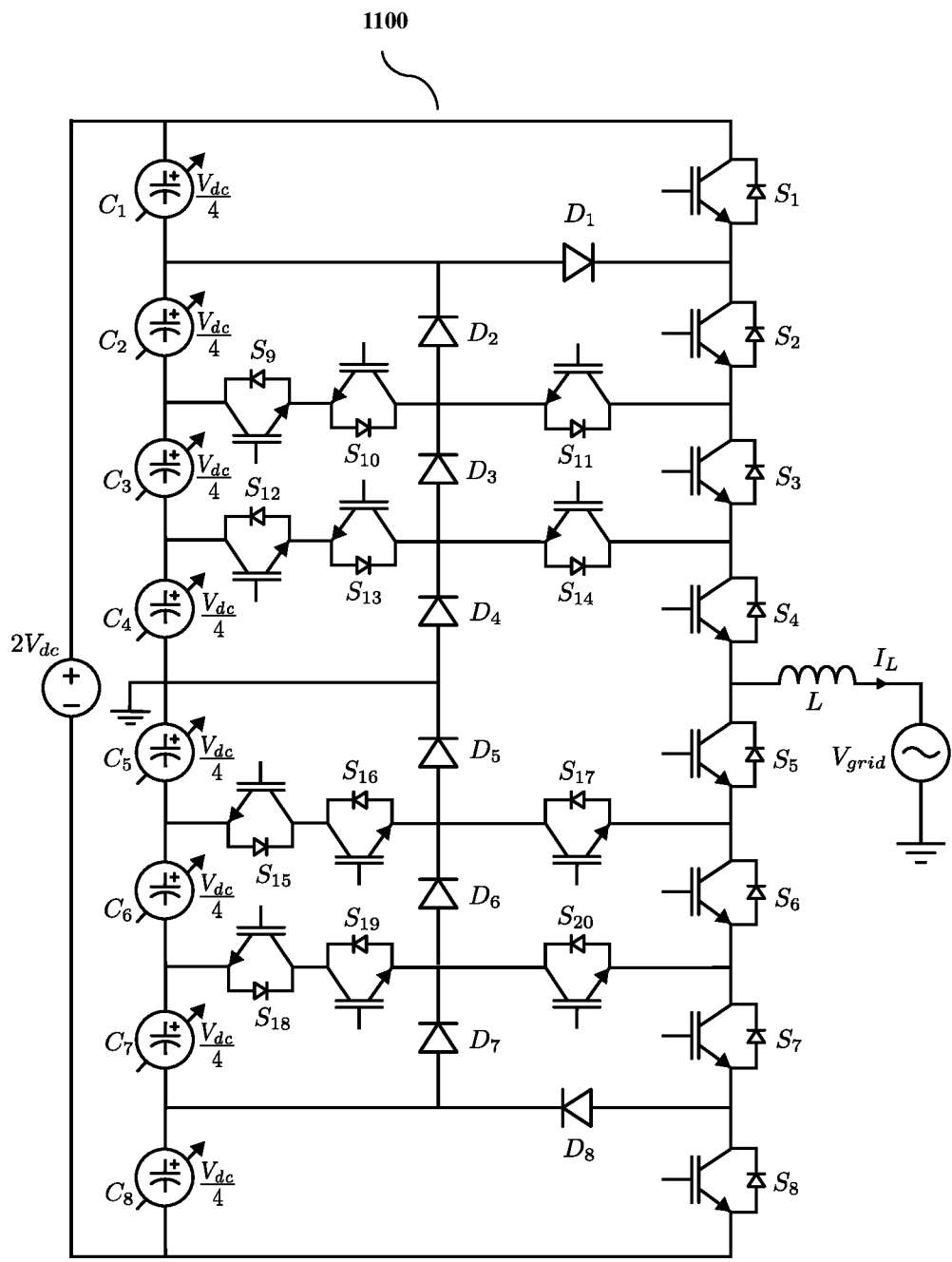
FIG. 11 is a circuit diagram of a 9-level SM-NPC multilevel inverter, according to the embodiments as disclosed herein.

FIG. 11 is a circuit diagram of a 9-level SM-NPC multilevel inverter 1100, according to the embodiments as disclosed herein. Here the devices $S_1$, $D_1$, $D_2$, $S_{11}$, $S_9$, $S_{10}$, $S_{12}$, $S_{13}$, $D_7$, $D_8$, $S_8$, $S_{15}$, $S_{16}$, $S_{18}$, $S_{19}$ and $S_{20}$ are rated for $V_{dc}/4$, $S_2$, $D_3$, $S_{14}$, $S_{17}$, $D_6$, $S_7$ are rated for $V_{dc}/2$, $S_3$, $D_4$ $D_5$ $S_6$ for $3V_{dc}/4$ and $S_4$ and $S_5$ for $V_{dc}$. Thus, 9-level SM-NPC multilevel inverter 1100 is having 34 identical switches and 14 identical diodes, which make a total of 48 semiconductors devices each rated for $V_{dc}/4$. In comparison with conventional 9-level NPC which is having 16 switches and 56 diodes, the 9-level SM-NPC requires 24 fewer semiconductor devices. The + and − symbols shown in Table-7 represents the positive and negative current directions respectively. The 9-level output voltages are $V_{dc}$, $3V_{dc}/4$, $V_{dc}/2$, $V_{dc}/4$, 0, $-V_{dc}/4$, $-V_{dc}/2$, $-3V_{dc}/4$, and $-V_{dc}$. The $V_{dc}$ output voltage is obtained by operating $S_1$, $S_2$, $S_3$ and $S_4$, the $3V_{dc}/4$ output voltage is obtained by operating one of $S_2$, $S_3$ and $S_4$, and $S_{11}$, $S_3$ and $S_4$, the $V_{dc}/2$ output voltage is obtained by operating one of $S_9$, $S_{10}$, $S_{11}$, $S_3$ and $S_4$, and $S_9$, $S_{10}$, $S_{14}$, and $S_4$, the $V_{dc}/4$ output voltage is obtained by operating $S_4$, $S_{12}$, $S_{13}$ and $S_{14}$, the 0 output voltage is obtained by operating $S_4$, $S_5$, $S_{17}$ and $S_{14}$, the $-V_{dc}/4$ output voltage is obtained by operating $S_5$, $S_{15}$, $S_{16}$ and $S_{17}$, the $-V_{dc}/2$ output voltage is obtained by operating one of $S_{18}$, $S_{19}$, $S_{20}$, $S_6$ and $S_5$, and $S_{18}$, $S_{19}$, $S_{17}$, and $S_5$, the $-3V_{dc}/4$ output voltage is obtained by operating one of $S_7$, $S_6$ and $S_5$, and $S_{20}$, $S_6$ and $S_5$, and the $-V_{dc}$ output voltage is obtained by operating $S_5$, $S_6$, $S_7$ and $S_8$.

TABLE 7

| $V_0$ | Devices conducting | I |
|---|---|---|
| $V_{dc}$ | $S_1$, $S_2$, $S_3$ and $S_4$ | +/− |
| $\frac{3V_{dc}}{4}$ | $D_1$, $S_2$, $S_3$ and $S_4$ | + |
| $\frac{3V_{dc}}{4}$ | $D_2$, $S_{11}$, $S_3$ and $S_4$ | − |
| $\frac{V_{dc}}{2}$ | $S_9$, $S_{10}$, $S_{11}$, $S_3$ and $S_4$ | + |
| $\frac{V_{dc}}{2}$ | $S_9$, $S_{10}$, $S_{14}$, $D_3$ and $S_4$ | − |
| $\frac{V_{dc}}{4}$ | $S_4$, $S_{12}$, $S_{13}$ and $S_{14}$ | +/− |
| 0 | $S_4$, $S_5$, $D_4$, $D_5$, $S_{17}$ and $S_{14}$ | +/− |
| $-\frac{V_{dc}}{4}$ | $S_5$, $S_{15}$, $S_{16}$ and $S_{17}$ | +/− |
| $-\frac{V_{dc}}{2}$ | $S_{18}$, $S_{19}$, $S_{20}$, $S_6$ and $S_5$ | − |
| $-\frac{V_{dc}}{2}$ | $S_{18}$, $S_{19}$, $S_{17}$, $D_6$ and $S_5$ | + |
| $-\frac{3V_{dc}}{4}$ | $D_8$, $S_7$, $S_6$ and $S_5$ | − |
| $-\frac{3V_{dc}}{4}$ | $S_{20}$, $D_7$, $S_6$ and $S_5$ | + |
| $-V_{dc}$ | $S_5$, $S_6$, $S_7$ and $S_8$ | +/− |

Figure 12:
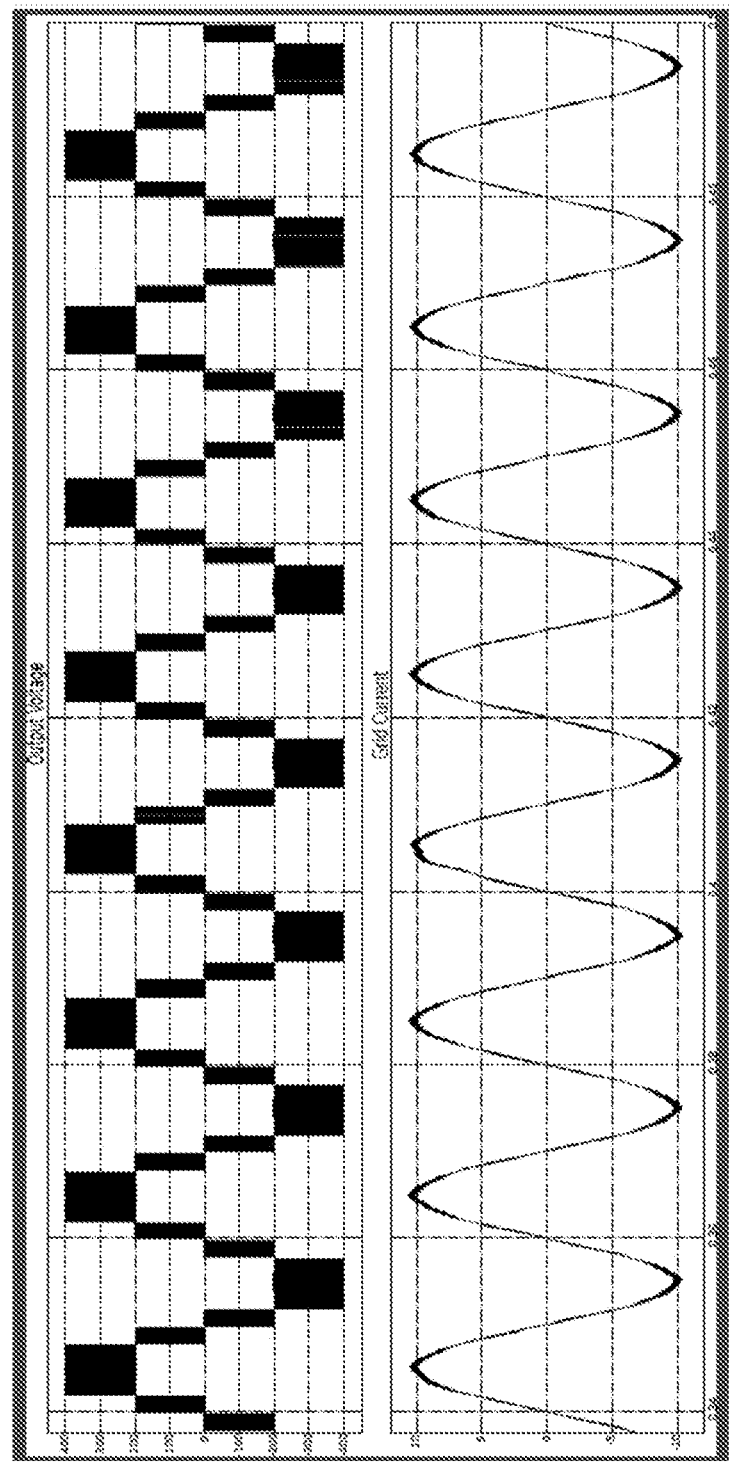
FIG. 12 is a graph showing an output voltage and a grid current for the 5-level SM-NPC multilevel inverter, according to the embodiments as disclosed herein.

FIG. 12 is a graph showing an output voltage and a grid current for the 5-level SM-NPC multilevel inverter 900, according to the embodiments as disclosed herein.

Figure 13:
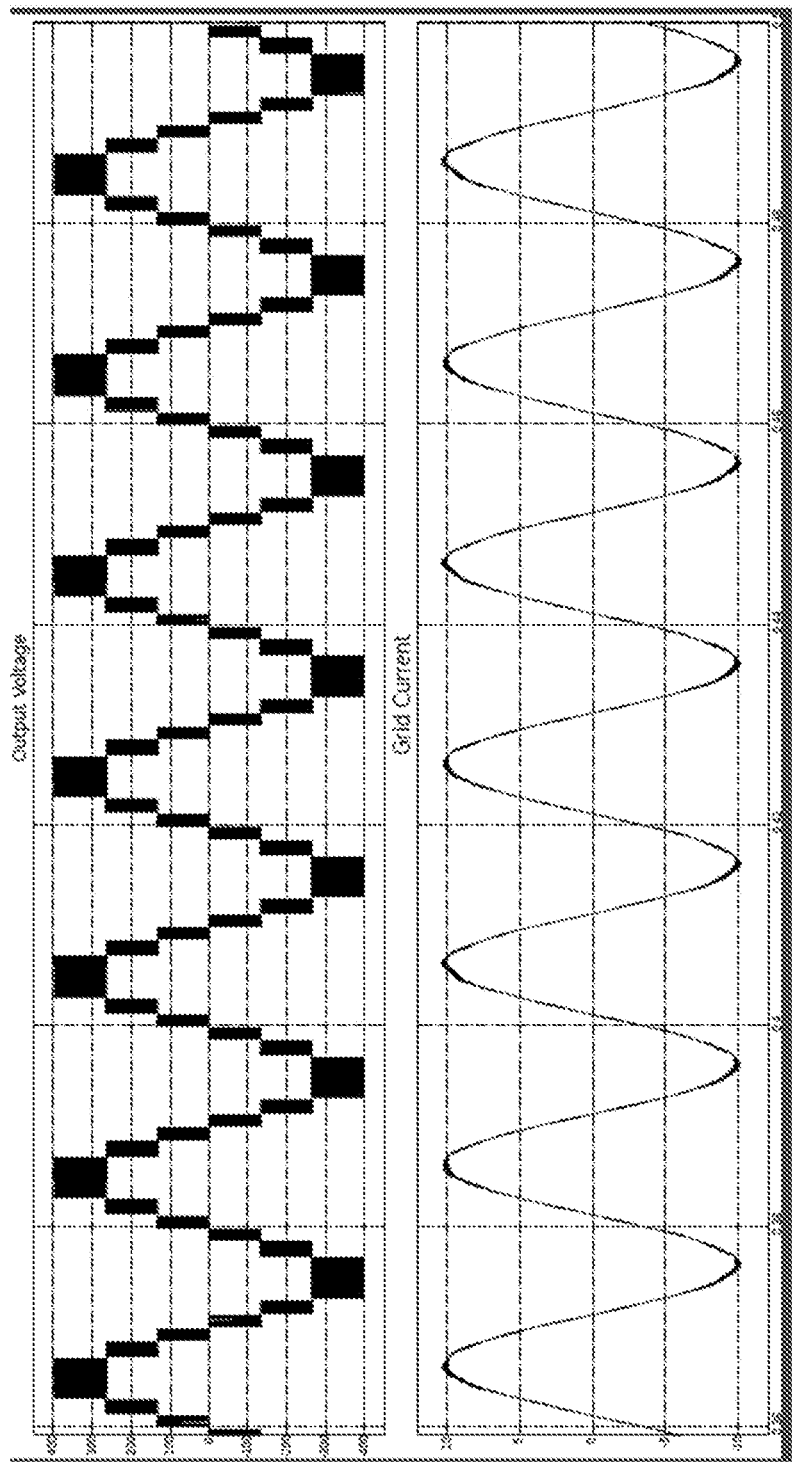
FIG. 13 is a graph showing an output voltage and a grid current for the 7-level SM-NPC multilevel inverter, according to the embodiments as disclosed herein.
Figure 14:
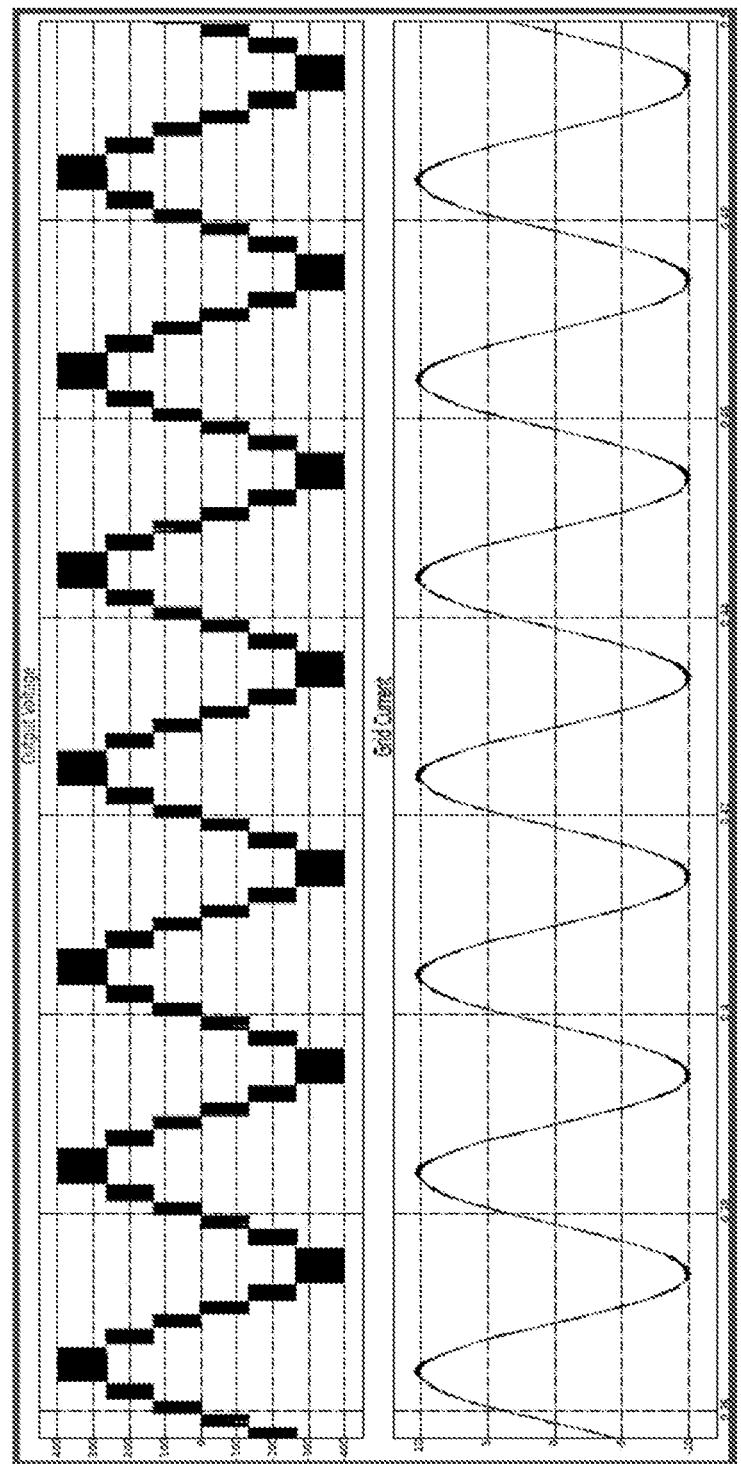
FIG. 14 is a graph showing an output voltage and a grid current for the 7-level SM-NPC multilevel inverter operating for 20° lead pf angle, according to the embodiments as disclosed herein.

FIG. 13 is a graph showing the output voltage and the grid current for the 7-level SM-NPC multilevel inverter 1000 operating for 20° lag pf angle, according to the embodiments as disclosed herein. FIG. 14 is a graph showing the output voltage and the grid current for the 7-level SM-NPC multilevel inverter 1000 operating for 20° lead pf angle, according to the embodiments as disclosed herein.

To verify the working of the proposed model, a simulation model of single phase converter is built in Matlab simulink. The simulation parameters used are summarized in Table-8. The inverter operates in a current control mode with a reference current of 10 A. The inverter can supply real as well as reactive power. To demonstrate this, the 5 level SM-NPC multilevel inverter 900 is simulated for unity power factor, 7 level SM-NPC multilevel inverter 1000 is simulated for 20° lag pf angle and lead pf angle.

TABLE 8

| Parameter | Value |
|---|---|
| DC link voltage ($V_{dc}$) | 400 V |
| Switching frequency | 10 kHz |
| Grid voltage/frequency | 230 V/50 Hz |
| Grid inductance | 8 mH |

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed:

1. A hybrid multilevel inverter for generating N-level output voltages, the hybrid multilevel inverter comprising:
    at least one bidirectional switch operable to block both polarities of voltages and to allow current in either direction;
    a plurality of Direct Current (DC) link capacitors;
    at least one intermediate capacitor;
    a plurality of switches;
    wherein the plurality of the DC link capacitors connected between a neutral point and a positive terminal of a DC link is equal to the plurality DC link capacitors connected between a negative terminal of the DC link and the neutral point, wherein the neutral point of the hybrid multilevel inverter is connected to an output terminal of the hybrid multilevel inverter through the plurality of switches, the at least one intermediate capacitor, and at least one bi-directional switch to obtain zero output voltage level; and
    generating the N-level output voltages, wherein the hybrid multilevel inverter generates the N-level output voltages based on operating the plurality of DC link capacitors and the plurality of switches, wherein for an input DC voltage of $2V_{dc}$, the peak of the output voltage lies between $V_{dc}$ and $-V_{dc}$ and has N levels each of $2V_{dc}/(N-1)$.

2. The hybrid multilevel inverter of claim 1, comprises:
    controllable capacitor network of the at least one intermediate capacitor which are connected together through the plurality of switches, wherein the controllable capacitor network of the at least one intermediate capacitor consists of at least one full bridge;
    wherein the controllable capacitor network of the at least one intermediate capacitor is connected to the neutral point through the at least one bidirectional switch and connected to the DC link through the plurality of switches, wherein the neutral point is connected to the output terminal through the at least one bidirectional switch, the controllable capacitor network of the at least one intermediate capacitor and the plurality of switches;

wherein zero output voltage level is obtained by connecting the neutral point to the output terminal by operating the at least one bi-directional switch and bypassing the controllable capacitor network of the at least one intermediate capacitor; and generating the N-level output voltages based on switching pattern of the plurality of switches which results in one of charging, and discharging of the controllable capacitor network of the at least one intermediate capacitor for each voltage level.

3. The hybrid multilevel inverter of claim 1, further comprises:
plurality of cells formed by connecting at least one of the plurality of DC link capacitors, a set of diodes, the plurality of switches and the at least one bidirectional switch;
wherein a common point of the plurality of DC link capacitor is connected to the output terminal of the hybrid multilevel inverter through the plurality of switches, the set of diodes and the at least one bi-directional switch;
wherein at least one terminal of the plurality of DC link capacitor is connected to at least one bi-directional switch;
wherein the plurality of DC link capacitor comprises a controllable voltage source, wherein the controllable voltage source consists of a circuit network of the plurality of DC link capacitor connected together through the plurality of switches; and
wherein the zero output voltage level is obtained by directly connecting the neutral point to the output terminal through the plurality of switches, the set of diodes and the at least one bi-directional switch.

4. The hybrid multilevel inverter of claim 1, wherein the hybrid multilevel inverter comprises:
a plurality of switches;
the plurality of DC link capacitors; and
the at least one intermediate capacitor;
wherein the hybrid multilevel inverter generates the N-level output voltages based on switching pattern of the plurality of switches which results in one of charging, and discharging of the at least one intermediate capacitor for each voltage level, wherein the hybrid multilevel inverter charges and discharges the at least one intermediate capacitor to maintain a constant average voltage across the at least one intermediate capacitor.

5. The hybrid multilevel inverter of the claim 4, wherein one of: the at least one intermediate capacitor comprises a controllable voltage source, wherein the controllable voltage source consisting of a switched capacitor network of one or more sub modules capacitor connected in series.

6. The hybrid multilevel inverter of claim 1, wherein the hybrid multilevel inverter generates the N-level output by series connection of the at least one intermediate capacitor and a network of the plurality of DC link capacitor, and wherein for an input dc voltage of $2V_{dc}$ and each of the DC link capacitor voltage of $V_{dc}$, wherein the at least one intermediate capacitor voltage is controlled to be kept constant at $0.5V_{dc}$ and the voltage across a sub module capacitors are maintained at a voltage of $0.5V_{dc}/N$.

7. The hybrid multilevel inverter of claim 2, wherein the input side consist of the plurality of DC link capacitor each rated for $V_{dc}$ and the at least one intermediate capacitor, wherein the voltage across the at least one intermediate capacitor is maintained at $0.5V_{dc}$ wherein output voltages associated with a 5-level hybrid multilevel inverter for an input voltage of $2V_{dc}$ are $V_{dc}$, $V_{dc}/2$, 0, $-V_{dc}/2$, and $-V_{dc}$, wherein the output voltage across the at least one intermediate capacitor is maintained at $0.5V_{dc}$, wherein the $V_{dc}$ output voltage is obtained by operating $S_1$ and $S_2$, wherein the $V_{dc}/2$ output voltage is obtained by operating one of $S_1$, $S_3$ and $S_2$, $S_6$, $S_7$ and $S_8$ wherein the zero output voltage is obtained by operating one of $S_2$, $S_5$, $S_7$, $S_8$ and $S_3$, $S_6$, $S_7$, $S_8$, wherein $-V_{dc}/2$ output voltage is obtained by operating one of $S_2$ and $S_4$ or $S_3$, $S_5$, $S_7$ and $S_8$, and wherein $-V_{dc}$ output voltage is obtained by operating $S_3$ and $S_4$.

8. The hybrid multilevel inverter of claim 2, wherein the hybrid multilevel inverter consists of the plurality of DC link capacitor each rated for $V_{dc}$ and at least one intermediate capacitor, wherein the voltage across one of the at least one intermediate capacitor and flying capacitors (FC's) is maintained at $2V_{dc}/3$ and $V_{dc}/3$ respectively, wherein output voltages associated with a 7-level hybrid multilevel inverter for the DC link voltage of $2V_{dc}$ are $V_{dc}$, $2V_{dc}/3$, $V_{dc}/3$, 0, $-V_{dc}/3$, $-2V_{dc}/3$, and $-V_{dc}$.

9. The hybrid multilevel inverter of claim 2, wherein the hybrid multilevel inverter consists of the plurality of DC link capacitor each rated for $V_{dc}$ and the at least one intermediate capacitor, wherein the voltage across the at least one intermediate capacitors is maintained at $V_{dc}/2$ and $V_{dc}/4$ which are cross-connected to obtain 9-level output voltage, wherein the output voltages associated with the 9-level hybrid multilevel inverter for DC link voltage of $2V_{dc}$ are $V_{dc}$, $3V_{dc}/4$, $V_{dc}/2$, $V_{dc}/4$, 0, $-V_{dc}/4$, $-V_{dc}/2$, $-3V_{dc}/4$, and $-V_{dc}$.

10. The hybrid multilevel inverter of claim 3,
wherein said hybrid multilevel inverter is configured to produce the N-level output voltages based on a switching pattern of said plurality of switches and input voltage source of $2V_{dc}$.

11. The hybrid multilevel inverter of claim 3, wherein a 5-level output voltages are $V_{dc}$, $V_{dc}/2$, 0, $-V_{dc}/2$, and $-V_{dc}$, wherein a set of 8 switches ($S_1$-$S_8$) and four diodes ($D_1$-$D_4$) are connected to obtain said 5-level output voltages.

12. The hybrid multilevel inverter of claim 11,
wherein said $V_{dc}$ output voltage is obtained by operating $S_1$ and $S_2$;
wherein the $V_{dc}/2$ output voltage is obtained by operating one of said $S_2$, $S_7$ and $S_8$;
wherein the 0 output voltage is obtained by operating $S_5$-$S_8$;
wherein the $-V_{dc}/2$ output voltage is obtained by operating one of: $S_3$, $S_7$ and $S_8$; and
wherein the $-V_{dc}$ output voltage is obtained by operating $S_3$ and $S_4$.

13. The hybrid multilevel inverter of claim 3, wherein a 7-level output voltages are $V_{dc}$, $2V_{dc}/3$, $V_{dc}/3$, 0, $-V_{dc}/3$, $-2V_{dc}/3$, and $-V_{dc}$, wherein a set of 12 switches ($S_1$-$S_{12}$) and six diodes ($D_1$-$D_6$) are connected to obtain said 7-level output voltages.

14. The hybrid multilevel inverter of claim 13,
wherein said $V_{dc}$ output voltage is obtained by operating $S_1$, $S_2$ and $S_3$;
wherein said $2V_{dc}/3$ output voltage is obtained by operating one of $S_2$ and $S_3$, and $S_{11}$;
wherein said $V_{dc}/3$ output voltage is obtained by operating $S_3$, $S_7$, $S_8$, and $S_{ii}$;
wherein said 0 output voltage is obtained by operating $S_3$ and $S_4$;
wherein said $-V_{dc}/3$ output voltage is obtained by operating $S_4$, $S_9$, $S_{10}$ and $S_{12}$;
wherein said $-2V_{dc}/3$ output voltage is obtained by operating one of $S_{12}$, and $S_4$ and $S_5$; and
wherein said $-V_{dc}$ output voltage is obtained by operating $S_4$, $S_5$, and $S_6$.

15. The hybrid multilevel inverter of claim 3, wherein a 9-level output voltages are $V_{dc}$, $3V_{dc}/4$, $V_{dc}/2$, $V_{dc}/4$, 0, $-V_{dc}/4$, $-V_{dc}/2$, $-3V_{dc}/4$, and $-V_{dc}$, wherein a set of 20 switches ($S_1$-$S_{20}$) and eight diodes ($D_1$-$D_8$) are connected to obtain said 9-level output voltages.

16. The hybrid multilevel inverter of claim 15,
wherein said $V_{dc}$ output voltage is obtained by operating $S_1$, $S_2$, $S_3$ and $S_4$;
wherein said $3V_{dc}/4$ output voltage is obtained by operating one of $S_2$, $S_3$ and $S_4$, and $S_{11}$, $S_3$ and $S_4$;
wherein said $V_{dc}/2$ output voltage is obtained by operating one of $S_9$, $S_{10}$, $S_{11}$, $S_3$ and $S_4$, and $S_9$, $S_{10}$, $S_{14}$, and $S_4$;
wherein said $V_{dc}/4$ output voltage is obtained by operating $S_4$, $S_{12}$, $S_{13}$ and $S_{14}$;
wherein said 0 output voltage is obtained by operating $S_4$, $S_5$, $S_{17}$ and $S_{14}$;
wherein said $-V_{dc}/4$ output voltage is obtained by operating $S_5$, $S_{15}$, $S_{16}$ and $S_{17}$;
wherein said $-V_{dc}/2$ output voltage is obtained by operating one of $S_{18}$, $S_{19}$, $S_{20}$, $S_6$ and $S_5$, and $S_{18}$, $S_{19}$, $S_{17}$, and $S_5$;
wherein said $-3V_{dc}/4$ output voltage is obtained by operating one of $S_7$, $S_6$ and $S_5$, and $S_{20}$, $S_6$ and $S_5$; and
wherein said $V_{dc}$ output voltage is obtained by operating $S_5$, $S_6$, $S_7$ and $S_8$.

17. A hybrid multilevel inverter for generating N-level output voltages, the hybrid multilevel inverter comprising:
at least one bidirectional switch operable to block both polarities of voltages and to allow current in either direction;
a plurality of Direct Current (DC) link capacitors;
at least one intermediate capacitor;
a plurality of switches;
wherein the plurality of the DC link capacitors connected between a neutral point and a positive terminal of a DC link is equal to the plurality DC link capacitors connected between a negative terminal of the DC link and the neutral point, wherein the neutral point of the hybrid multilevel inverter is connected to an output terminal of the hybrid multilevel inverter through a plurality of switches, at least one intermediate capacitor, and at least one bi-directional switch to obtain zero output voltage level;
a controllable capacitor network of the at least one intermediate capacitor which are connected together through the plurality of switches, wherein the controllable capacitor network of the at least one intermediate capacitor consists of at least one full bridge;
wherein the controllable capacitor network of the at least one intermediate capacitor is connected to the neutral point through the at least one bidirectional switch and connected to the dc link through the plurality of switches, wherein the neutral point is connected to the output terminal through the at least one bidirectional switch and the controllable capacitor network of the at least one intermediate capacitor and the plurality of switches;
wherein zero output voltage level is obtained by connecting the neutral point to the output terminal by operating the at least one bi-directional switch and bypassing the controllable capacitor network of the at least one intermediate capacitor; and
generating the N-level output voltages, comprises at least one of:
operating the plurality of DC link capacitors and the plurality of switches, wherein for an input DC voltage of $2V_{dc}$, the peak of the output voltage lies between $V_{dc}$ and $-V_{dc}$ and has N levels each of $2V_{dc}/(N-1)$, and
switching pattern of the plurality of switches which results in one of charging, and discharging of the controllable capacitor network of the at least one intermediate capacitor for each voltage level.

18. A hybrid multilevel inverter for generating N-level output voltages, the hybrid multilevel inverter comprising:
at least one bidirectional switch operable to block both polarities of voltages and to allow current in either direction;
a plurality of Direct Current (DC) link capacitors;
a plurality of switches;
a plurality of cells formed by connecting the plurality of DC link capacitors, diodes, the plurality of switches and the at least one bidirectional switch;
wherein, the common point of the plurality of DC link capacitor is connected to the output terminal though the plurality of switches, a set of diodes and the at least one bi-directional switch;
wherein at least one terminal of the plurality of DC link capacitor is connected to the at least one bi-directional switch;
wherein the plurality of DC link capacitor comprises a controllable voltage source, wherein the controllable voltage source consists of a circuit network of the plurality of DC link capacitor connected together through plurality of switches;
wherein zero output voltage level is obtained by connecting neutral point of the hybrid multilevel inverter is connected to an output terminal of the hybrid multilevel inverter through one of a plurality of switches and at least one bi-directional switch and through the plurality of switches and one of the set of diodes and the bi-directional switches; and
generating the N-level output voltages, wherein the hybrid multilevel inverter generates the N-level output voltages based on operating the plurality of DC link capacitors and the plurality of switches, wherein for an input DC voltage of $2V_{dc}$, the peak of the output voltage lies between $V_{dc}$ and $-V_{dc}$ and has N levels each of $2V_{dc}/(N-1)$.

* * * * *